May 10, 1938.   J. R. YOUNG   2,117,074

RADIO DIAL KNOB

Filed May 1, 1933

Inventor
James Russell Young
By Samuel Scrivener Jr.
Attorney

Patented May 10, 1938

2,117,074

UNITED STATES PATENT OFFICE 2,117,074

RADIO DIAL KNOB

James Russell Young, Ann Arbor, Mich., assignor to Barnes-Gibson-Raymond, Inc., Detroit, Mich., a corporation of Michigan Application May 1, 1933, Serial No. 668,838

2 Claims. (Cl. 287—53)

The present invention has to do with means for attaching a knob to a shaft which is to be turned by means of the knob.

An object of the present invention is to provide a device for attaching a knob to a shaft, which device will provide a rigid connection between the knob and the shaft.

Another object is to provide a device for attaching a knob to a shaft, which device may be easily and simply attached to the knob.

Another object is to provide a secure and rigid connection between a knob and a shaft and which will also allow ready and easy removal of the knob from the shaft.

Another object is to provide a device for connecting a knob to a shaft, which device will embody means for preventing relative rotation between such device and the knob.

Another object is to provide a device for attaching a knob to a shaft, which device will comprise means for preventing relative rotation between the shaft and such device.

Another object is to provide a device for connecting a knob to a shaft, which device will provide a bearing between the knob and the shaft over the entire periphery of the shaft.

A further object is to provide a device for attaching a knob to a shaft, which device will be simple in construction, which may be easily and cheaply manufactured, but which will be strong and durable.

Other objects and features of novelty will be apparent from the following description and drawing, it being expressly understood, however, that the invention is in no way limited by such description and drawing or otherwise than by the appended claims.

Referring to the drawing, in which similar reference numerals refer to like parts;

Figure 1:
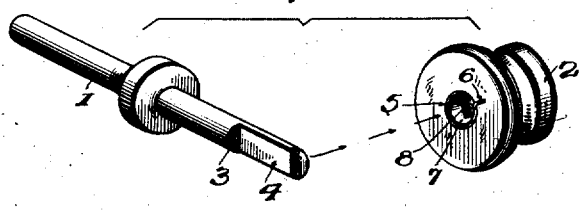
Fig. 1 is a view showing a shaft and knob before being assembled, the knob having the attaching means fitted therein.

Referring now to the drawing, it will be seen that the reference numeral 1 denotes a shaft to which a knob 2 is to be attached, whereby the shaft may be turned by the knob. One end of shaft 1 is cut away as at 3 to provide a flat surface 4 for a purpose which will appear hereinafter.

Figure 2:
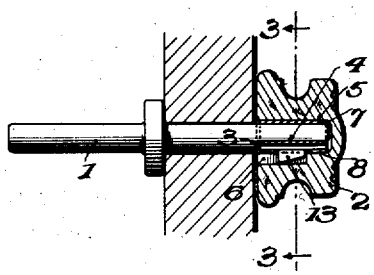
Fig. 2 is a sectional view through the knob and shaft on the line 2—2 of Fig. 3.
Figure 3:
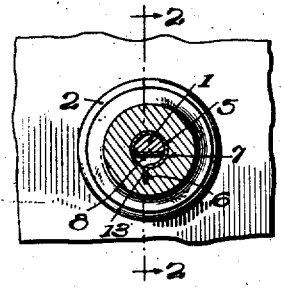
Fig. 3 is a sectional view through the knob and attaching device on the line 3—3 of Fig. 2.

The knob 2 is provided with an opening 5 of circular cross-section extending axially therethrough and into which the end of the shaft is to be received. Extending in a radial direction from such opening is provided a cut or slot 6 which, as shown in Fig. 2, need not extend as far in an axial direction as the opening 5. The slot 6 is preferably relatively small in breadth and should be only a knife-cut in width for a purpose which will appear hereinafter.

Figure 4:
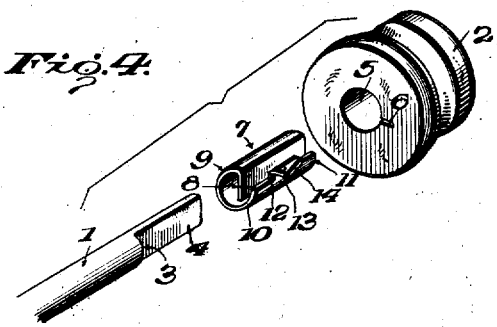
Fig. 4 is an exploded view showing the shaft, attaching device and knob in position to be assembled.

Means are provided by the invention for attaching the knob to the shaft, and such means comprise a sleeve-like element 7 which may be formed of metal or other suitable material and which is of such a length that it may be received in the opening 5 in the knob without protruding externally thereof. The member 7, which may be termed a spring bushing, may be stamped or formed from sheet metal and is formed as a hollow cylinder throughout approximately 270° of its cross-section. Instead of continuing the deformation of the metal forming the bushing to form a complete cylinder, the end of the metal is turned inwardly to form a flat portion 8 which extends as a chord across the cross-section of the spring bushing. It will thus be seen that a bushing has been formed having a cylindrical portion 9 and a flattened side 8 which are adapted to cooperate respectively with the partially cylindrical end of the shaft 1 and with the cut-away and flattened portion thereof. The remaining portion 10 of the cylindrical part of the bushing terminates in the edge 11 and, as clearly disclosed in Fig. 4 of the drawing, the mid-portion of the longitudinal length of the portion 10 is extended beyond the edge 11, as at 12, to form a tongue which is turned outwardly from the spring bushing a short distance from the edge 11, as at 13, thereby forming a right-angled tongue or lug midway between the ends of the edge 11 and having one portion thereof extending radially outward from the spring bushing 7. The outer edge 14 of this radially-extending tongue is formed at an angle to the longitudinal direction of the edge 11, whereby such tongue may be more easily pushed into the slot 6.

It will be noted that the spring bushing is to be formed with an outside diameter slightly greater than the diameter of the opening 5 in the knob, whereby the bushing may be tightly received in such opening and resiliently held therein by resilient deformation of the bushing and particularly that portion adjacent the edge 11. The inside dimensions of the bushings should be such that the cut-away and flattened end of shaft may be tightly received therein and resiliently maintained there by resilient deformation of the flat portion 8 of the spring bushing.

In assembling the device, the spring bushing 1 is inserted into the opening 5 in the knob, as shown in Fig. 1, and pushed thereinto against the resistance caused by the resilient pressure of the spring bushing against the walls of the opening due to the fact that the spring bushing is of slightly greater diameter than the opening. The tongue 13, extending radially outward from the spring bushing, is adapted to enter the slot 6 in the knob, and its entry therein is facilitated by the slanting configuration of the entering edge 14 thereof, all as clearly disclosed in Fig. 2. Due to the cooperation between tongue 13 and slot 6 it will be apparent that all possibility of the spring bushing turning relatively to the knob is done away with. The spring bushing is forced into opening 6 until it is entirely disposed therein.

When it is desired to attach the knob to the shaft, either the knob or shaft may be turned until the flat portion 8 of the spring bushing, which is now disposed within the knob, is aligned with the flat face 4 of the cut-away portion 3 of the shaft, at which time the end of the shaft may be inserted into the spring bushing. Due to the fact that the internal cross-section of the spring bushing is slightly smaller than the cross-section of the end of the shaft, a tight and rigid connection between the bushing and shaft will be provided, and the flat portion 8 of the spring bushing will exert a resilient pressure against the flat face 4 of the cut-away portion of the shaft, thereby not only providing a rigid connection but also preventing any possibility of relative rotation between the shaft and the bushing.

While one modification of my invention has been illustrated and described in the present application, it will be apparent to those skilled in the art that modifications and changes may be made therein without departing in any way from the spirit of the invention, for the limits of which reference must be had to the appended claims.

What I claim is:

1. A device for attaching a knob to a shaft comprising a strip of metal bent to cylindrical shape, one end of said strip forming a flat portion disposed as a chord of said cylindrical portion, and the other end of said strip being offset radially of said cylindrical portion.

2. In combination, a cylindrical shaft having a portion of the periphery thereof cut away at one end to provide a flat surface, a knob having an opening therein within which the end of said shaft including said flat surface is adapted to be received, and means for attaching said knob to said shaft, said means comprising a bushing member having a cylindrical portion lining a part of the wall of the opening in said knob and received between said wall and the cylindrical surface of said shaft end, a second portion extending from said cylindrical portion across and in yielding contact with substantially the entire flat surface of said shaft, and a third portion extending radially from said cylindrical portion and adapted to extend into the material of the knob and attach the bushing member thereto.

JAMES RUSSELL YOUNG.

---

CERTIFICATE OF CORRECTION.

Patent No. 2,117,074.    May 10, 1938.

JAMES RUSSELL YOUNG.

It is hereby certified that the above numbered patent was erroneously issued to Barnes-Gibson-Raymond, Inc., of Detroit, Michigan, a corporation of Michigan, whereas said patent should have been issued to Associated Spring Corporation of Delaware, a corporation of Delaware, as assignee by mesne assignments, as shown by the records of assignments in this office; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.

may be tightly received therein and resiliently maintained there by resilient deformation of the flat portion 8 of the spring bushing.

In assembling the device, the spring bushing 1 is inserted into the opening 5 in the knob, as shown in Fig. 1, and pushed thereinto against the resistance caused by the resilient pressure of the spring bushing against the walls of the opening due to the fact that the spring bushing is of slightly greater diameter than the opening. The tongue 13, extending radially outward from the spring bushing, is adapted to enter the slot 6 in the knob, and its entry therein is facilitated by the slanting configuration of the entering edge 14 thereof, all as clearly disclosed in Fig. 2. Due to the cooperation between tongue 13 and slot 6 it will be apparent that all possibility of the spring bushing turning relatively to the knob is done away with. The spring bushing is forced into opening 6 until it is entirely disposed therein.

When it is desired to attach the knob to the shaft, either the knob or shaft may be turned until the flat portion 8 of the spring bushing, which is now disposed within the knob, is aligned with the flat face 4 of the cut-away portion 3 of the shaft, at which time the end of the shaft may be inserted into the spring bushing. Due to the fact that the internal cross-section of the spring bushing is slightly smaller than the cross-section of the end of the shaft, a tight and rigid connection between the bushing and shaft will be provided, and the flat portion 8 of the spring bushing will exert a resilient pressure against the flat face 4 of the cut-away portion of the shaft, thereby not only providing a rigid connection but also preventing any possibility of relative rotation between the shaft and the bushing.

While one modification of my invention has been illustrated and described in the present application, it will be apparent to those skilled in the art that modifications and changes may be made therein without departing in any way from the spirit of the invention, for the limits of which reference must be had to the appended claims.

What I claim is:

1. A device for attaching a knob to a shaft comprising a strip of metal bent to cylindrical shape, one end of said strip forming a flat portion disposed as a chord of said cylindrical portion, and the other end of said strip being offset radially of said cylindrical portion.

2. In combination, a cylindrical shaft having a portion of the periphery thereof cut away at one end to provide a flat surface, a knob having an opening therein within which the end of said shaft including said flat surface is adapted to be received, and means for attaching said knob to said shaft, said means comprising a bushing member having a cylindrical portion lining a part of the wall of the opening in said knob and received between said wall and the cylindrical surface of said shaft end, a second portion extending from said cylindrical portion across and in yielding contact with substantially the entire flat surface of said shaft, and a third portion extending radially from said cylindrical portion and adapted to extend into the material of the knob and attach the bushing member thereto.

JAMES RUSSELL YOUNG.

---

CERTIFICATE OF CORRECTION.

Patent No. 2,117,074.          May 10, 1938.

JAMES RUSSELL YOUNG.

It is hereby certified that the above numbered patent was erroneously issued to Barnes-Gibson-Raymond, Inc., of Detroit, Michigan, a corporation of Michigan, whereas said patent should have been issued to Associated Spring Corporation of Delaware, a corporation of Delaware, as assignee by mesne assignments, as shown by the records of assignments in this office; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.

CERTIFICATE OF CORRECTION.

Patent No. 2,117,074.  May 10, 1938.

JAMES RUSSELL YOUNG.

It is hereby certified that the above numbered patent was erroneously issued to Barnes-Gibson-Raymond, Inc., of Detroit, Michigan, a corporation of Michigan, whereas said patent should have been issued to Associated Spring Corporation of Delaware, a corporation of Delaware, as assignee by mesne assignments, as shown by the records of assignments in this office; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents